United States Patent Office 3,636,177
Patented Jan. 18, 1972

3,636,177
PROCESS FOR PRODUCING DURENE
Takashi Suzuki and Hiroyuki Iesaka, Niigata, Japan, assignors to Japan Gas Chemical Company, Inc., Chiyoda-ku, Tokyo, Japan
No Drawing. Filed May 20, 1970, Ser. No. 39,145
Claims priority, application Japan, May 22, 1969, 44/39,121
Int. Cl. C07c 5/28
U.S. Cl. 260—668 A    7 Claims

ABSTRACT OF THE DISCLOSURE

Durene is produced in high yield by isomerizing other tetramethylbenzenes with a HF—$BF_3$ catalyst in the liquid phase in the presence of a diluent comprising benzene or methyl-substituted benzenes having 9 or less carbon atoms, whereby suppressing disproportionation and transmethylation of tetramethylbenzenes.

---

This invention relates to a process for producing durene by isomerization of isodurene, prehnitene, or mixtures of tetramethylbenzenes.

Durene is an important substance as the basic starting material for the production of synthetic resins and fibers, and is obtainable by various manufacturing methods. However, in every known method mixtures of tetramethylbenzene isomers are formed so that it is not easy to obtain essentially pure durene, and also the yield of durene is greatly reduced due to the formation of the tetramethyl benzene isomers. Therefore, it has been necessary to isomerize the by-product tetramethylbenzene isomers other than durene into durene, and separate the durene selectively from the reaction mixture thus obtained.

It is known in the art to isomerize polymethylbenzenes with an acidic catalyst in the liquid or gaseous phase; however, disproportionation and transmethylation reactions, which give rise to other difficult problems during the process, occurs concurrently with the isomerization. The disproportionation and transmethylation reactions result in an undesirable conversion of tetramethylbenzenes to pentamethylbenzenes and hexamethylbenzenes instead of durene. This, in turn results in an additional load on the separation and purification procedures for obtaining the durene produced.

The liquid phase process for isomerizing polymethylbenzenes using a catalyst consisting of hydrogen fluoride and boron trifluoride has an advantage in that the catalyst has low temperature activity whereas the solid catalyst employed in the gaseous phase process does not. U.S. Pat. No. 2,784,242 proposed a method for preparation of durene by isomerizing polymethylbenzenes in the presence of a HF—$BF_3$ catalyst. However, this process has no practical use due to the concurrence of the disproportionation of polymethylbenzenes.

The use of saturated hydrocarbons, which are inert under a HF—$BF_3$ atmosphere, has been proposed to suppress the disproportionation and transmethylation reactions by their dilution effect. However, unlike the case in the production of xylenes where a saturated hydrocarbon such as n-heptane suppresses the disproportionation reaction, in the case of tetramethylbenzenes, contrary to the case the disproportionation or transmethylation reaction cannot be suppressed by the use of saturated hydrocarbons as a diluent in the production of durene.

The object of this invention is to provide a process for producing durene by isomerization of tetramethylbenzenes while suppressing the occurrence of side reactions.

From the present study on the isomerization reaction of tetramethylbenzenes in the presence of HF—$BF_3$ catalyst, it has been found that the disproportionation and transmethylation reactions of tetramethylbenzenes proceed in quite different manners depending upon the type of diluents used. Thus, in particular it was found that in producing durene by isomerization of isodurene, prehnitene, or mixtures of tetramethylbenzenes containing durene in an amount less than that in the equilibrium composition, it is possible to produce durene without decreasing the rate of isomerization, while effectively suppressing the disproportionation or transmethylation reaction of tetramethylbenzenes by carrying out the isomerization in the presence of benzene or polymethylbenzenes having 9 or less carbon atoms.

According to the present invention, durene is produced by isomerization of isodurene, prehnitene, or mixtures of tetramethylbenzenes in liquid phase in the presence of HF—$BF_3$ catalyst. The isomerization is carried out in the presence of benzene or methyl-substituted benzenes containing 9 or less carbon atoms to suppress the normally concurrent disproportionation and transmethylation reaction of tetramethylbenzenes.

The starting material used in the present process may be isodurene, prehnitene, or mixtures of tetramethylbenzenes containing durene in an amount less than that in the equilibrium composition. Therefore, the feed material may be a mother liquor obtained by cooling a mixture of tetramethylbenzenes containing an almost equilibrium amount of durene and separating the crystallized durene from said mixture, or it may be a concentrated isodurene obtained by extraction with HF—$BF_3$ as an extractant. The feedstock can also comprise a mixture of tetramethylbenzenes having not only the aromatic hydrocarbon fraction having 10 carbon atoms, which is obtained from the catalytic reformate or thermal cracking residue of petroleum fractions, but also the reaction products obtained by disproportionation reaction or methylation of trimethylbenzenes and other reaction products containing tetramethylbenzenes.

As the diluent in the present process, there may be used benzene, toluene, o-xylene, p-xylene, m-xylene, hemimellitene, pseudocumene and mesitylene, each alone or in combination. When the raw material already contains the present diluent, as in the case when the mixture containing tetramethylbenzenes obtained by disproportionation reaction or methylation as mentioned above, it can be used directly as the starting material. The diluent hydrocarbon is used in a proportion of 20 to 200 parts (the term "part" used herein means part by mole), preferably 50 to 150 parts per 100 parts of tetramethylbenzenes. The use of more than 200 parts of the diluent is of no advantage. Since the amount of boron trifluoride to be used as catalyst affects the isomerization rate and disproportionation rate, as well as the equilibrium composition of the tetramethylbenzenes, it must be predetermined accurately. The amount of boron trifluoride generally used is within the range of 1 to 20 parts, preferably 4 to 13 parts. The use of more than 20 parts of boron trifluoride is undesirable because of its promoting effect on side reactions and its deteriorating effect of decreasing the content of durene in the equilibrium composition. The use of less than 1 part of boron trifluoride is unpractical because the isomerization rate becomes so slow that an excessively long time will be necessary before the equilibrium state is attained.

The amount of hydrogen fluoride to be used is generally within the range of 30 to 300 parts, preferably 50 to 250 parts. The most suitable amount is determined relative to the amount of boron trifluoride, because the amount of hydrogen fluoride should be within the range where the co-existing boron trifluoride will act most effectively as catalyst, said range being 0.04 to 0.20 mole, preferably 0.08 to 0.15 mole of boron trifluoride per mole of hydrogen fluoride. When mole ratios outside of said range are used disadvantages such as promotion of the disproportionation or transmethylation reaction of tetramethylbenzenes, and suppression of the isomerization rate may be brought about.

Under the conditions set forth above, the isomerization reaction in the present process may reach an equilibrium state in about 30 minutes at a temperature of 80 to 120° C., preferably 90 to 110° C. At temperatures below 80° C. the isomerization reaction proceeds without any inconvenience but somewhat slower and the completion of reaction is prolonged. At temperatures above 120° C., the increase in the rate of isomerization is accompanied by promotion of the disproportionation reaction. As for the pressure, there is no particular limitation. The isomerization is usually carried out under the autogenous vapor pressure at the reaction temperature, which generally ranges from 2 to 20 kg./cm.$^2$.

The equilibrium mixture of tetramethylbenzenes obtained in the present process is composed of approximately 45 percent of durene, 50 percent of isodurene and 5 percent of prehnitene, and is distributed between two immiscible layers, a catalyst phase (HF phase) and a hydrocarbon phase. The basicity of tetramethylbenzene isomers with respect to hydrogen fluoride and boron trifluoride differs widely from each other. Isodurene predominately forms a complex with HF—BF$_3$ and is selectively dissolved in the catalyst phase. Hence, the proportion of isodurene to other isomers becomes far greater in the catalyst phase than in the hydrocarbon phase, and accordingly the proportion of durene and prehnitene is smaller in the catalyst phase. Consequently, the isomerization of tetramethylbenzenes may be conducted in a continuous manner by separating the catalyst phase from the hydrocarbon phase by phase separation without decomposing the complex with HF—BF$_3$, and recycling the catalyst phase as the feed material to the reactor.

The product durene is recovered in the form of crystals by cooling the hydrocarbon phase at 0° C., or by distillating off from the raffinate containing durene and prehnitene, obtained by extracting isodurene completely into the catalyst phase after the addition of further amount of HF—BF$_3$. By either one of said procedures durene in a purity of more than 95% may easily be obtained.

The process of the present invention will be illustrated by the following examples. The tetramethylbenzene mixture used in the examples was composed of 10.4 percent by mole of durene, 88.8 percent by mole of isodurene, and 0.8 percent by mole of prehnitene, the purity as tetramethylbenzenes being more than 98 percent. The degree of disproportionation of tetramethylbenzene was calculated from the equation, $$\begin{pmatrix}\text{Degree of disproportionation}\\ \text{of tetramethylbenzene}\end{pmatrix} = 100 - \dfrac{\begin{pmatrix}\text{Moles of C}_{10}\text{-hydrocarbons in}\\ \text{reaction mixture}\end{pmatrix} \times 100}{\begin{pmatrix}\text{Moles of C}_{10}\text{- and 2C}_{11}\text{-hydro-}\\ \text{carbons in reaction mixture}\end{pmatrix}}$$

EXAMPLE 1

1.00 mole of tetramethylbenzene and 1.00 mole of benzene were charged into a 400 cc. autoclave provided with an electromagnetic stirrer, and the autoclave was cooled to 15° C. After the addition of 1.00 mole of anhydrous hydrogen fluoride, the autoclave was heated to 100° C. while being stirred vigorously. 0.10 mole of boron trifluoride was introduced from a measuring tank into the autoclave while maintaining the temperature at 100° C., whereby the pressure in the autoclave rose to 6.0 kg./cm.$^2$ (gauge). The stirring was stopped after 30 minutes and the contents of autoclave were drawn off. The reaction product was washed with water to remove the acid, dried and analyzed by gas chromatography. The results were as shown in Table 1.

EXAMPLES 2–4

Reactions were carried out in the manner similar to that in Example 1. The reaction conditions and the analytical results were as shown in Table 1.

TABLE I

| Example | 1 | 2 | 3 | 4 |
|---|---|---|---|---|
| Feed (moles): | | | | |
| Tetramethylbenzene | 1.00 | 1.00 | 1.00 | 1.00 |
| Benzene | 1.00 | 1.00 | 1.00 | 1.00 |
| Hydrogen fluoride | 1.00 | 0.50 | 1.00 | 2.50 |
| Boron trifluoride | 0.10 | 0.05 | 0.13 | 0.13 |
| Reaction conditions: | | | | |
| Reaction period (min.) | 30 | 30 | 90 | 30 |
| Temperature (° C.) | 100 | 100 | 100 | 100 |
| Composition of hydrocarbons in reaction product (percent by mole): | | | | |
| Benzene | 50.0 | 49.9 | 50.0 | 50.0 |
| Toluene | 0 | 0 | 0 | 0 |
| Xylene | 0.1 | 0.1 | 0 | 0 |
| Trimethylbenzene | 0.2 | 0.4 | 0.5 | 0.4 |
| Tetramethylbenzene | 49.4 | 49.6 | 49.5 | 49.6 |
| Pentamethylbenzene | 0.3 | 0 | 0 | 0 |
| Composition of tetramethylbenzene (percent by mole): | | | | |
| Durene | 44.6 | 30.3 | 44.4 | 43.5 |
| Isodurene | 50.5 | 64.6 | 50.7 | 51.7 |
| Prehnitene | 4.9 | 5.1 | 4.9 | 4.8 |
| Degree of disproportionation of tetramethylbenzene (percent) | 1.1 | 0 | 0 | 0 |

COMPARATIVE EXAMPLES 1–2

Reactions were carried out in the manner similar to that in Example 1 except that no diluent was used. The reaction conditions and the analytical results were as shown in Table 2.

COMPARATIVE EXAMPLE 3

The reaction was carried out in the manner similar to that in Example 1 except that commercial grade n-hexane containing methylcyclopentane and isohexane in addition to n-hexane was used as the diluent. The reaction conditions and the analytical results were as shown in Table 2.

TABLE 2

| Comparative Example | 1 | 2 | 3 |
|---|---|---|---|
| Feed (mole): | | | |
| Tetramethylbenzene | 1.00 | 1.00 | 1.00 |
| Diluent | | | [1] 1.00 |
| Hydrogen fluoride | 1.00 | 0.50 | 1.00 |
| Boron trifluoride | 0.18 | 0.07 | 0.15 |
| Reaction conditions: | | | |
| Reaction period (min.) | 30 | 30 | 30 |
| Temperature (° C.) | 100 | 100 | 100 |
| Composition of hydrocarbons in reaction product (percent by mole): | | | |
| Benzene | 0 | 0 | 0 |
| Toluene | 0 | 0 | 0 |
| Xylene | 0.4 | 0.6 | 0.3 |
| Trimethylbenzene | 14.4 | 9.3 | 7.5 |
| Tetramethylbenzene | 69.5 | 82.5 | 34.9 |
| Pentamethylbenzene | 15.7 | 7.6 | 7.3 |
| n-Hexane | | | 50.0 |
| Composition of tetramethylbenzene (percent by mole): | | | |
| Durene | 43.6 | 33.7 | 47.4 |
| Isodurene | 51.9 | 61.6 | 48.0 |
| Prehnitene | 4.5 | 4.7 | 4.6 |
| Degree of disproportionation of tetramethylbenzene (percent) | 31.1 | 15.5 | 29.5 |

[1] n-Hexane.

EXAMPLES 5–7

Reactions were carried out in the manner similar to that in Example 1 except that toluene, xylene, or trimethylbenzene was used as the diluent. The reaction conditions and analytical results were as shown in Table 3.

TABLE 3

| Example | 5 | 6 | 7 |
|---|---|---|---|
| Feed (mole): | | | |
| Tetramethylbenzene | 1.00 | 0.60 | 0.60 |
| Diluent | ¹1.00 | ²0.60 | ³0.60 |
| Hydrogen fluoride | 1.00 | 0.60 | 0.60 |
| Boron trifluoride | 0.10 | 0.08 | 0.07 |
| Reaction conditions: | | | |
| Reaction period (min.) | 30 | 30 | 30 |
| Temperature (° C.) | 100 | 100 | 100 |
| Composition of hydrocarbons in reaction product (percent by mole): | | | |
| Benzene | 0 | 0 | 0.1 |
| Toluene | 50.0 | 0.1 | 0.1 |
| Xylene | 0.2 | 47.0 | 3.0 |
| Trimethylbenzene | 0.3 | 2.7 | 46.3 |
| Tetramethylbenzene | 49.3 | 50.0 | 49.4 |
| Pentamethylbenzene | 0.2 | 0.2 | 1.1 |
| Composition of tetramethylbenzene (percent by mole): | | | |
| Durene | 42.0 | 42.4 | 44.5 |
| Isodurene | 52.8 | 52.6 | 50.6 |
| Prehnitene | 5.2 | 5.0 | 4.9 |
| Degree of disproportionation of tetramethylbenzene | 0.8 | 0.8 | 4.3 |

¹ Toluene.
² p-Xylene.
³ Pseudocumene.

EXAMPLE 8

1.00 mole of 1,2,4-trimethylbenzene was charged into an autoclave similar to that used in Example 1. After the addition of 5.0 moles of hydrogen fluoride and 0.5 mole of boron trifluoride, the autoclave was heated to and at 100° C. with stirring to allow the disporportionation reaction to proceed for one hour. After the reaction was complete, the reaction product was poured into ice water, and washed with water to remove the acid. After being dried, the reaction product was analyzed by gas chromatography. The results obtained were as shown in column A of Table 4. The degree of disproportionation was found to be 41.5%.

After the addition of 1 mole of hydrogen fluoride and 0.1 mole of boron trifluoride to said disproportionation product containing xylenes and trimethylbenzene, the isomerization reaction was allowed to proceed under the same conditions and in the same way as those in Example 1. The results obtained were as shown in column B of Table 4.

TABLE 4

| Composition of hydrocarbons (percent by mole) | A | B |
|---|---|---|
| Benzene | | |
| Toluene | 1.6 | 1.8 |
| Xylenes | 18.0 | 19.8 |
| p-Xylene | 3.5 | 4.2 |
| o-Xylene | 4.4 | 4.3 |
| m-Xylene | 10.1 | 11.3 |
| Trimethylbenzenes | 58.5 | 55.4 |
| 1,3,5- | 37.8 | 23.3 |
| 1,2,4- | 19.1 | 29.5 |
| 1,2,3- | 1.6 | 2.6 |
| Tetramethylbenzenes | 21.6 | 22.5 |
| 1,2,4,5- | 2.8 | 10.5 |
| 1,2,3,5- | 18.6 | 10.7 |
| 1,2,3,4- | 0.2 | 1.3 |
| Polymethylbenzenes | 0.3 | 0.5 |

What is claimed is:

1. A process for producing durene by isomerizing under heating isodurene, prehnitene, or a mixture of tetramethylbenzenes in liquid phase in the presence of a catalyst consisting of hydrogen fluoride and boron trifluoride, which comprises conducting said isomerization reaction in the presence of a diluent chosen from benzene, methyl-substituted benzenes having 9 or less carbon atoms and mixtures thereof.

2. A process for producing durene by isomerizing under heating isodurene, prehnitene or a mixture of tetra methylbenzenes in liquid phase in the presence of a catalyst consisting of hydrogen fluoride and boron trifluoride, which comprises conducting said isomerization reaction in the presence of a diluent chosen from benzene, methyl-substituted benzenes having 9 or less carbon atoms and mixtures thereof at a temperature of 80° to 120° C., said catalyst being used in said isomerization reaction in the amount of 1 to 20 moles of boron trifluoride and 30 to 300 moles of hydrogen fluoride each per 100 moles of the tetramethylbenzenes, provided that the mole ratio of boron trifluoride to hydrogen fluoride is 0.04 to 0.20 in said catalyst.

3. A process according to claim 1 or 2, wherein the methyl-substituted benzenes is toluene, o-xylene, p-xylene, m-xylene, hemimellitene, pseudocumene, mesitylene or a mixture thereof.

4. A process according to claim 1 or 2, wherein the diluent is used in an amount of 20 to 200 moles per 100 moles of the tetramethylbenzenes.

5. A process according to claim 1 or 2, wherein the mixture of tetramethylbenzenes is a fraction of aromatic hydrocarbons having 10 carbon atoms obtained from the catalytic reforming or thermal cracking of petroleum.

6. A process for producing durene by isomerizing under heating tetramethylbenzenes in the presence of a catalyst consisting of hydrogen fluoride and boron trifluoride, which comprises conducting said isomerization reaction by heating a reaction mixture resulted from the disproportionation reaction or methylation of trimethyl benzenes at a temperature of 80° to 120° C., said catalyst being used in said isomerization in the amounts of 1 to 20 moles of boron trifluoride and 30 to 300 moles of hydrogen fluoride each per 100 moles of the tetramethylbenzenes, provided that the mole ratio of boron trifluoride to hydrogen fluoride is 0.04 to 0.20 in said catalyst.

7. A process for producing durene by isomerizing under heating isodurene, prehnitene or a mixture of tetramethylbenzenes in liquid phase in the presence of a catalyst consisting of hydrogen fluoride and boron trifluoride, which comprises conducting said isomerization reaction in the presence of a diluent chosen from benzene, methyl-substituted benzenes having 9 or less carbon atoms and a mixture thereof at a temperature of 80° to 120° C., said catalyst being used in said isomerization in the amounts of 1 to 20 moles of boron trifluoride and 30 to 300 moles of hydrogen fluoride each per 100 moles of the tetramethylbenzenes, provided that the mole ratio of boron trifluoride to hydrogen fluoride is 0.04 to 0.20 in said catalyst, separating the resultant reaction mixture into a catalyst layer and hydrocarbon layer, recycling the catalyst layer containing isodurene to the isomerization reaction system, and recovering durene from the hydrocarbon layer.

References Cited

UNITED STATES PATENTS

| 2,784,242 | 3/1957 | Lien et al. | 260—668 A |
| 2,814,651 | 11/1957 | McCaulay | 260—668 A |
| 3,219,720 | 11/1965 | Binder et al. | 260—668 A |

C. R. DAVIS, Primary Examiner